(12) United States Patent
Hayman et al.

(10) Patent No.: US 8,850,804 B2
(45) Date of Patent: Oct. 7, 2014

(54) DUAL PATH SAIR FOR DUAL PLANE INTEGRATED EXHAUST MANIFOLDS

(71) Applicant: GM Global Technology Operations LLC, Detroit, MI (US)

(72) Inventors: Alan W. Hayman, Romeo, MI (US); Kenneth M. Eastman, Troy, MI (US); Robert S. McAlpine, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/768,010

(22) Filed: Feb. 15, 2013

(65) Prior Publication Data

US 2014/0230772 A1 Aug. 21, 2014

(51) Int. Cl.
*F01N 3/05* (2006.01)
*F01N 3/34* (2006.01)
*F02F 1/00* (2006.01)

(52) U.S. Cl.
CPC ... *F02F 1/00* (2013.01); *F01N 3/05* (2013.01); *F01N 3/34* (2013.01)
USPC .............. 60/306; 60/304; 60/305; 123/193.3; 123/193.5

(58) Field of Classification Search
CPC ............... F01N 3/05; F01N 3/30; F01N 3/34; F02B 33/44; F02M 25/07
USPC ............... 123/193.3, 193.5; 60/304, 305, 306
See application file for complete search history.

(56) References Cited

U.S. PATENT DOCUMENTS

| 3,949,715 | A | * | 4/1976 | Faix et al. | 123/184.42 |
| 5,761,904 | A | * | 6/1998 | Nakayama | 60/293 |
| 7,051,685 | B2 | | 5/2006 | Hayman et al. | |
| 7,197,869 | B2 | * | 4/2007 | Kokubo et al. | 60/305 |
| 7,597,081 | B2 | * | 10/2009 | Aw | 123/193.5 |
| 8,429,896 | B2 | * | 4/2013 | Pekrul et al. | 60/282 |
| 8,464,519 | B2 | * | 6/2013 | Rippert et al. | 60/289 |
| 2008/0265524 | A1 | * | 10/2008 | Mori | 277/595 |
| 2012/0210712 | A1 | | 8/2012 | Wu et al. | |

FOREIGN PATENT DOCUMENTS

EP 1101921 A2 * 5/2001 ............... F02F 1/38

* cited by examiner

*Primary Examiner* — Noah Kamen
*Assistant Examiner* — Grant Moubry
(74) *Attorney, Agent, or Firm* — Harness, Dickey & Pierce, P.L.C.

(57) ABSTRACT

A secondary air injection or SAIR system is illustrated and described which includes a first air injection path defined by in part by a lower ditch formed in the head mounting surface of the cylinder block, and a second air injection path defined in part by a second ditch formed in the block mounting surface. The cylinder head gasket is used to separate and seal the first ditch from the second ditch. The first and second air injection paths are separate and isolated from one another such that secondary air may be selectively introduced through the first air injection path into the first exhaust leg and selective introduced through the second injection path into the second exhaust leg independent of the first air injection path.

20 Claims, 6 Drawing Sheets

DUAL PATH SAIR FOR DUAL PLANE INTEGRATED EXHAUST MANIFOLDS

FIELD

The present disclosure relates to secondary air injection or SAIR system in an internal combustion engine, and more particularly to a SAIR system having separate flow paths for each set of runners in a bifurcated exhaust system, thus providing a dual path SAIR for dual plane integrated exhaust manifolds.

BACKGROUND

This section provides background information related to the present disclosure which is not necessarily prior art.

A typical automotive engine is an internal combustion device which includes an engine block having multiple cylinders. Each cylinder supports a piston for reciprocating movement. A cylinder head is coupled to a top surface of the engine block such that the block and head define a combustion chamber. The cylinder head includes a set of intake ports and a set of exhaust ports for each cylinder which, in combination with the intake valves and exhaust valves, allow combustion gases to enter and exit the combustion chambers. An intake manifold and an exhaust manifold are typically coupled to the cylinder head for routing the combustion gases to and from the intake and exhaust ports.

Such an automotive engine may be equipped with secondary air injection (SAIR) as part of the emissions control system. The SAIR system injects air into the exhaust stream to allow for a more complete combustion of exhaust gases by supporting the efficient function of the catalytic converter. When the engine is cold, the injected air can clean up the relatively rich exhaust and bring the catalytic converter to operating temperature quickly. Once the engine is warm, the injected air can assist with catalysis of unburned hydrocarbons and carbon monoxide. SAIR systems may be implemented in a variety of ways with either pumped air injection or aspirated air injection. Regardless of the method of implementation, the system must provide an air path for injecting air into the exhaust gas stream near the combustion chamber of the engine, either at the exhaust ports in the cylinder head or in the exhaust manifold.

The implementation of SAIR systems requires additional components such as pumps, valves and fluid passageways. With the recent developments in cylinder block and cylinder head design and fabrication, it is desirable to integrate these components for space efficiencies. Likewise, it is desirable to optimize the control of air injection for improved SAIR performance.

SUMMARY

This section provides a general summary of the disclosure, and is not a comprehensive disclosure of its full scope or all of its features.

A dual path SAIR system is disclosed to improve SAIR performance and to minimize torque loss with its implementation. The dual path SAIR system employs two separate flow paths for injecting air into separate exhaust legs. The SAIR system disclosed herein employs a dual plane concept to also take advantage of the design flexibility afforded by the use of an integrated exhaust manifold assembly. As used herein, the term integrated exhaust manifold refers to an integral or monolithic structure forming a portion of the cylinder head assembly covering the exhaust ports and at least a portion of the exhaust legs associated with a manifold.

The SAIR system as illustrated and described herein includes first and second air injection paths. The first air injection path includes a first supply passage providing fluid communication to a first ditch formed in the head mounting surface of the cylinder block, and a first runner providing fluid communication from the first ditch to a first exhaust leg in the exhaust manifold. The second air injection path includes a second supply passage providing fluid communication to a second ditch formed in the block mounting surface, a second runner providing fluid communication from the second ditch to the second leg. The first and second air injection paths are separate and sealed from one another such that secondary air may be selectively introduced through the first air injection path into the first exhaust leg and selective introduced through the second injection path into the second exhaust leg independent of the first air injection path. Independent valves are operably coupled to the first and second supply passages for controlling air injection.

The SAIR system summarized above is particularly well suited for use in an internal combustion engine having a cylinder block with at least a first cylinder and a second cylinder. A cylinder head is securely fastened to the cylinder block and has a first exhaust port formed therethrough and in fluid communication with the first cylinder and a second exhaust port formed therethrough and in fluid communication with the second cylinder. A head gasket is disposed between a head mounting surface formed on the cylinder block and a block mounting surface formed on the cylinder head. An integrated exhaust manifold extends from the cylinder head and includes a first exhaust leg having a first passageway formed therethrough to provide fluid communication from the first exhaust port to a first exit port and a second leg having a second passageway formed therethrough to provide fluid communication from the second exhaust port to a second exit port. Air is selectively injected through the first air injection path from the first control valve through the first ditch formed in the head mounting surface to the first exhaust leg. Air is also selectively injected through the second air injection path from a second control valve through the second ditch formed in the block mounting surface to the second exhaust leg. Since the second ditch is sealed and isolated from the first ditch, air injection to the first exhaust leg can be controlled independently from air injection to the second exhaust leg. Thus, a dual SAIR for dual plane integrated exhaust manifolds is provided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope of this disclosure to those who are skilled in the art. Specific details may be set forth to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known structures, and well-known technologies are not described in detail.

The terminology used herein is for the purpose of describing particular example embodiments only and is not intended to be limiting. As used herein, the singular forms "a," "an," and "the" may include the plural forms as well, unless the context clearly indicates otherwise. The terms "comprises," "comprising," "including," and "having," are inclusive and therefore specify the presence of recited structure(s) or step (s); for example, the stated features, integers, steps, operations, groups elements, and/or components, but do not preclude the presence or addition of additional structure(s) or step(s) thereof. The methods, steps, processes, and operations described herein are not to be construed as necessarily requiring performance in the stated or any particular order discussed or illustrated, unless specifically identified as an order of performance. It is also to be understood that additional, alternative or equivalent steps may be employed.

When structure is referred to as being "on," "engaged to," "connected to," or "coupled to" other structure, it may be directly or indirectly (i.e., via intervening structure) on, engaged, connected or coupled to the other structure. In contrast, when structure is referred to as being "directly on," "directly engaged to," "directly connected to," or "directly coupled to" the other structure, there may be no intervening structure present. Other words used to describe the relationship between elements should be interpreted in a like fashion (e.g., "between" versus "directly between," "adjacent" versus "directly adjacent"). As used herein, the term "and/or" includes any and all combinations of one or more of the associated referenced items.

Terms of degree (e.g., first, second, third) which are used herein to describe various structure or steps are not intended to be limiting. These terms are used to distinguish one structure or step from other structure or steps, and do not imply a sequence or order unless clearly indicated by the context of their usage. Thus, a first structure or step similarly may be termed a second structure or step without departing from the teachings of the example embodiments. Likewise, spatially relative terms (e.g., "inner," "outer," "beneath," "below," "lower," "above," "upper") which are used herein to describe the relative special relationship of one structure or step to other structure or step(s) may encompass orientations of the device or its operation that are different than depicted in the figures. For example, if a figure is turned over, structure described as "below" or "beneath" other structure would then be oriented "above" the other structure without materially affecting its special relationship or operation. The structure may be otherwise oriented (e.g. rotated 90 degrees or at other orientations) and the spatially relative descriptors used herein interpreted accordingly.

With reference now to the figures, combustion of an air/fuel mixture within an engine 10 produces exhaust that includes hydrocarbons, carbon oxides, nitrogen oxides, water, and other byproducts. A catalytic converter 12 reacts with components of the exhaust before the exhaust is expelled from the vehicle. For example, the catalyst oxidizes hydrocarbons in the exhaust. The catalyst's ability to oxidize hydrocarbons may be limited by the amount of oxygen in the exhaust gas stream. A secondary air injection (SAIR) system 14 includes an air pump 16 and a pair of control valves 18, 20 which introduce air into the exhaust system upstream of catalytic converter 12. The additional oxygen provided by the SAIR system increases the ability of catalytic converter 12 to oxidize hydrocarbons. The SAIR system 14 described and illustrated herein provides a dual path secondary air injection system which is integrated into the cylinder block 22, cylinder head 24 and exhaust manifold 48 components of the engine 10.

Referring now to FIGS. 1-5, wherein like numerals indicate like parts throughout the several views, a portion of a multiple-cylinder internal combustion engine 10 is schematically represented. Engine 10 includes an cylinder block 22 having a plurality of cylinders 28 formed therein. A head mounting surface 30 is formed on the top of cylinder block 22. A cylinder head 24 coupled to the top of cylinder block 22 over cylinders 28. The cylinder head 24 has a block mounting surface 32 which faces head mounting surface 30 when cylinder block 22 and cylinder head 24 are securely fastened together. A head gasket 34 is interposed between cylinder block 22 and cylinder head 24 to provide a seal therebetween. The cylinder head 24 has a set of intake ports 40 and a set of exhaust ports 42 in fluid communication with the cylinders 28. The embodiment illustrated in FIGS. 1-5 includes four cylinders 28.1, 28.2, 28.3, 28.4 (collectively 28) having two intake ports 40.1, 40.2 (collectively 40) and two exhaust ports 42.1, 42.2 (collectively 42) associated with each cylinder 28.

Figure 1:
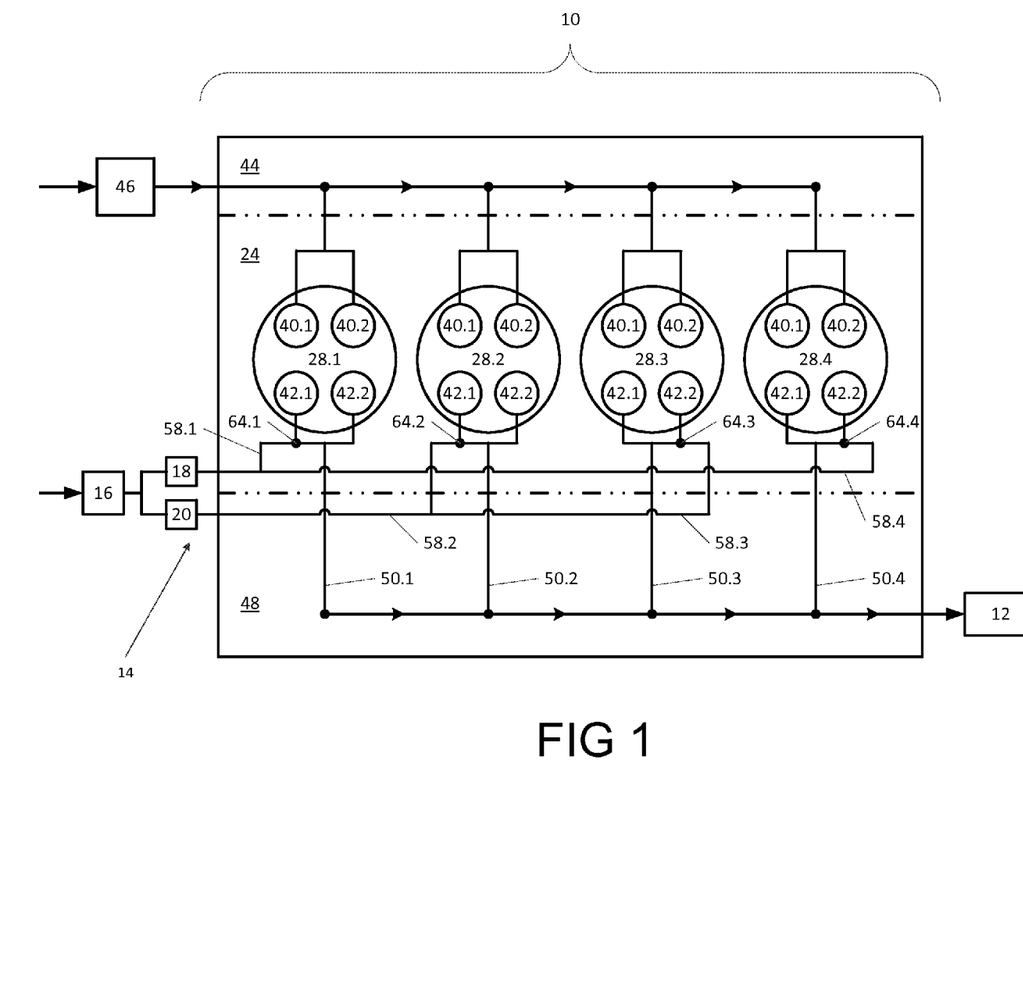
FIG. 1 is a schematic representation of an engine having a dual path SAIR for dual plane integrated exhaust manifolds.

An intake manifold 44 is coupled to the cylinder head 24 for supplying combustion gases (in the form of air or an air/fuel mixture) through intake ports 40 and into the cylinders 28. A set of intake valves (not shown) are supported on the cylinder head 24 and operate to selectively open and close intake ports 40. A throttle valve 46 is operably coupled to intake manifold 44 and controls the amount of combustion gases entering intake manifold 44.

Integrated exhaust manifold 48 collects combustion by-product gases and delivers these exhaust gases to catalytic converter 12. As used herein, the term integrated exhaust manifold refers to the portion of the exhaust manifold 48 including exhaust legs 50.1, 50.2, 50.3, 50.4 (collectively 50) that is integral with cylinder head 24. Exhaust legs 50.1 and 50.4 join together and terminate at exit port 52.1. Exhaust legs 50.2 and 50.3 join together and terminate at exit port 52.2. An exhaust manifold with this configuration is known as a dual plane or bifurcated manifold. Exit ports 52.1, 52.2 are collectively 52. In other words, cylinder head 24 and exhaust manifold 48 form a monolithic structure. The cylinder head 24 and integrated exhaust manifold 48 described herein can be fabricated using any suitable manufacturing processes known to one of ordinary skill in the art of engine component fabrication.

Figure 4:
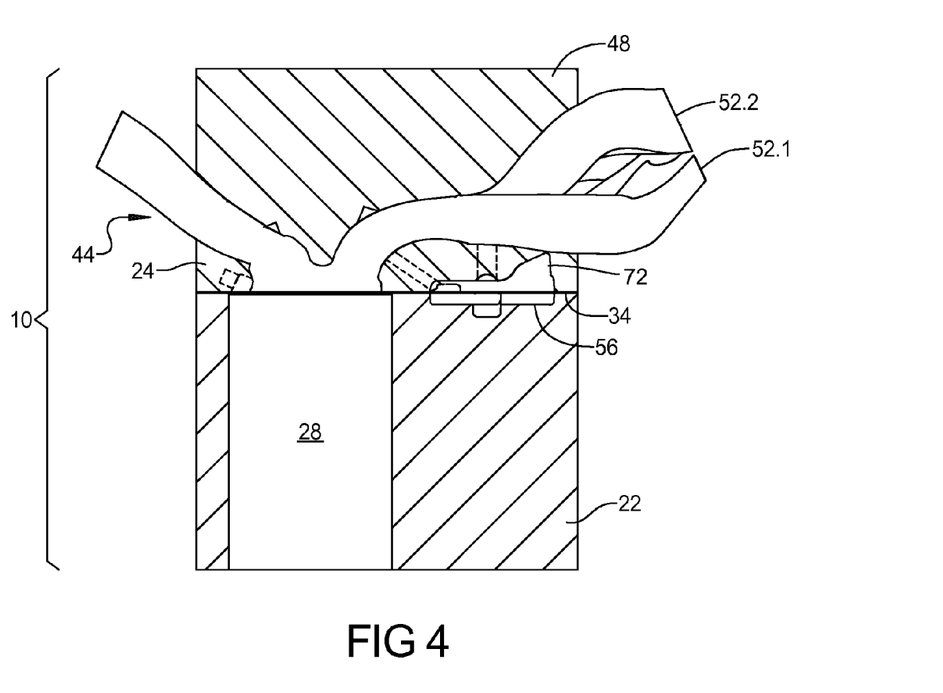
FIG. 4 is a vertical cross-section showing a simplified representation of an engine block assembly having a dual path SAIR for dual plane integrated exhaust manifolds.
Figure 5:
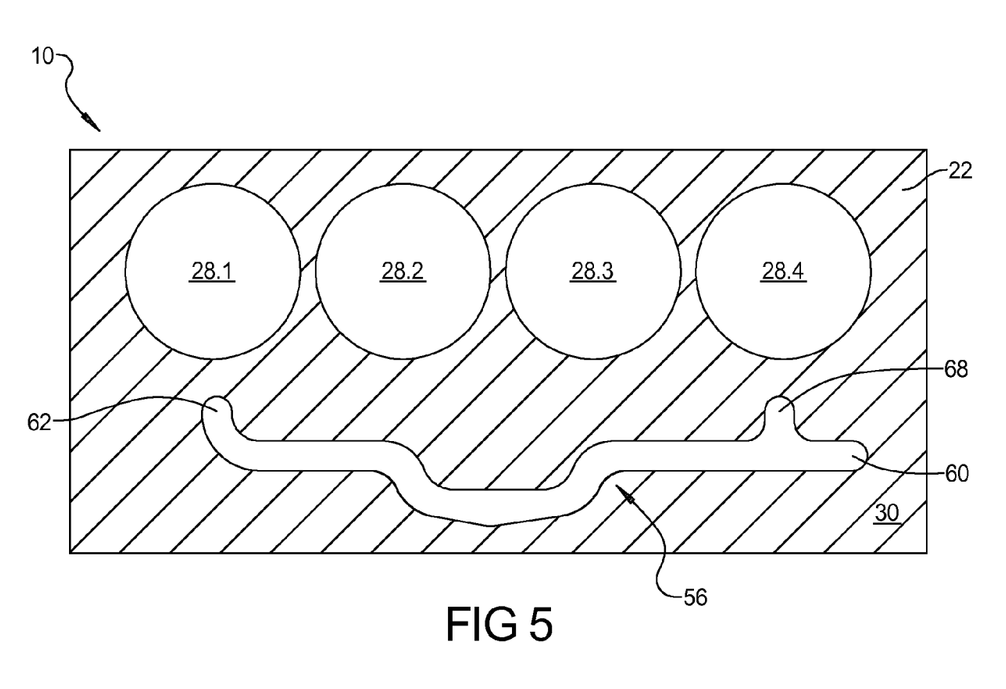
FIG. 5 is a transverse cross-section of the engine block assembly in FIG. 4 illustrating the cylinder block and lower ditch.

The secondary air injection system 14 includes a first air injection path for selectively introducing air into the first and fourth exhaust legs 50.1, 50.4. The first air injection path is defined by a supply passage 54, a lower ditch 56 and a pair of runners 58.1, 58.4. As best seen in FIGS. 4 and 5, the lower ditch 56 is formed in head mounting surface 30 of cylinder block 22 adjacent to cylinders 28. Control valve 18 is operably coupled to supply passage 54 of the first air injection path to control injection of secondary air into the first and fourth exhaust legs 50.1, 50.4. Supply passage 54 terminates at an inlet region 60 of lower ditch 56. Runner 58.1 starts at outlet region 62 of lower ditch 56 and intersects exhaust leg 50.1 at injection point 64.1 adjacent exhaust ports 42 for cylinder 28.1. Runner 58.4 starts at outlet region 66 of lower ditch 56 and intersects exhaust leg 50.4 at injection point 64.4 adjacent exhaust ports 42 for cylinder 28.4. As presently preferred, injection points 64.1, 64.4 are spaced approximately 7 mm from valve seats 68 formed in exhaust ports 42 for the respective cylinders 28.1, 28.4.

Figure 6:
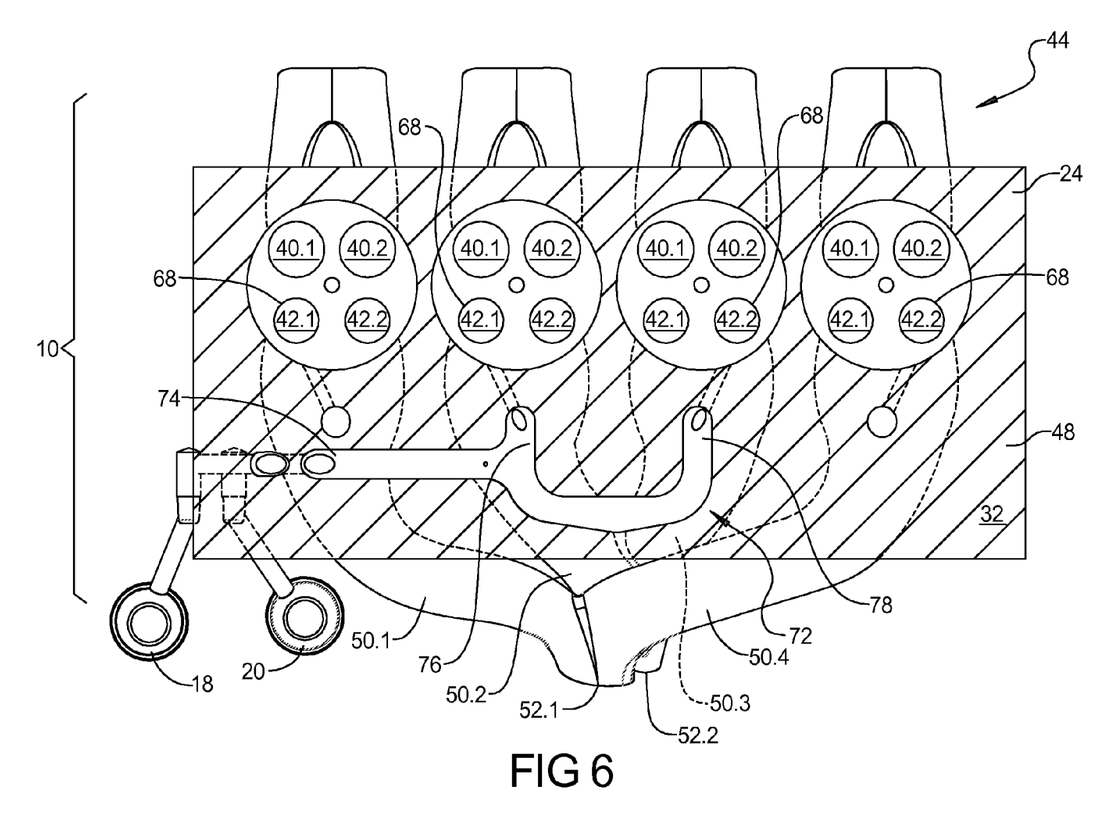
FIG. 6 is a transverse cross-section of the engine block assembly in FIG. 4 illustrating the cylinder head and upper ditch.

The secondary air injection system 14 also includes a second air injection path for selectively introducing air into the second and third exhaust legs 50.2, 50.3. The second air injection path is defined by a supply passage 70, an upper ditch 72 and a pair of runners 58.2, 58.3. As best seen in FIGS. 4 and 6, upper ditch 72 is formed in block mounting surface 32 of cylinder head 24 adjacent exhaust ports 42. Control valve 20 is operably coupled to supply passage 70 to control injection of secondary air into the second air injection path to control injection of secondary air into second and third exhaust legs 50.2, 50.3. Supply passage 70 terminates at an inlet region 74 of upper ditch 72. Runner 58.2 starts at outlet region 76 of the upper ditch 72 and intersects exhaust leg 50.2 at injection point 64.2 adjacent exhaust ports 42 for cylinder 28.2. Runner 52.3 starts at outlet region 78 of upper ditch 72 and intersects exhaust leg 50.3 at injection point 64.3 adjacent exhaust ports 42 for cylinder 28.3. As presently preferred, injection points 64.2, 64.3 are spaced approximately 7 mm from valve seats 68 formed in exhaust ports 42 for the respective cylinders 28.2, 28.3.

Figure 2:
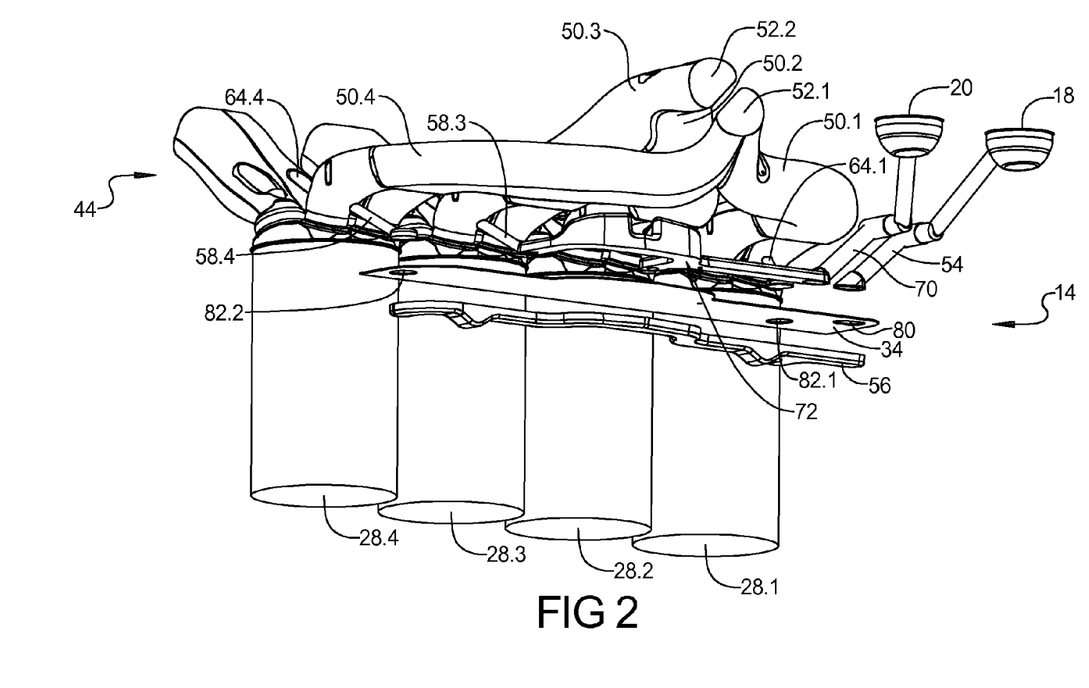
FIGS. 2 and 3 are 3-D representations showing an exploded view of the core or internal spaces of the engine assembly and a portion of the head gasket used to separate and seal the first and second secondary air paths.
Figure 3:
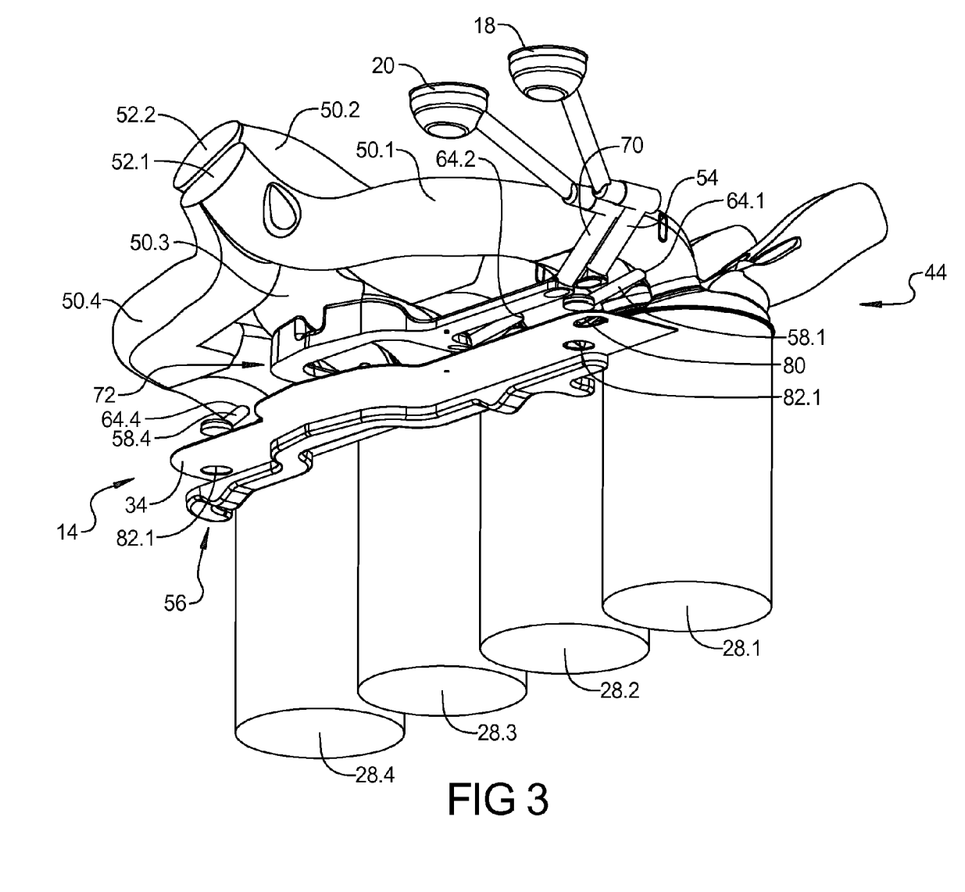

The head gasket 34 is interposed between head mounting surface 30 and block mounting surface 32 such that lower ditch 56 is separated and sealed from upper ditch 72. In this way, air flow through the first air injection path is isolated from air flow through the second air injection path. As presently preferred, a portion of supply passages 54, 70 and upper ditch 72 are formed in cylinder head 24. Runners 58.1-58.4 are formed in integrated exhaust manifold 48. The lower ditch 56 is formed in cylinder block 22. An inlet port 80 formed through head gasket 34 enables fluid communication across head gasket 34 from supply passage 54 to lower ditch 56. A pair of outlet ports 82.1, 82.4 formed through head gasket 34 enables fluid communication across head gasket 34 from lower ditch 56 to runners 58.1, 58.4, respectively. Thus, first and second air injection paths provide a dual path air flow passageway that is integrated into engine 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. For example, the features of a dual path SAIR system have been described in the context of an in-line four cylinder engine, however these features may be implemented in other multiple cylinder engine configuration. The same may also be varied in many ways. Such variations are not to be regarded as a departure from the disclosure, and all such modifications are intended to be included within the scope of the disclosure.

What is claimed is:

1. A secondary air injection system for an internal combustion engine of the type having a cylinder block with multiple cylinders, a cylinder head securely fastened to the cylinder block with a head gasket disposed between a head mounting surface formed on the cylinder block and a block mounting surface formed on the cylinder head, and an integrated exhaust manifold including a first exhaust leg having a first passageway formed therethrough to provide fluid communication from a first exhaust port formed in said cylinder head to a first exit port and a second exhaust leg having a second passageway formed therethrough to provide fluid communication from a second exhaust port formed in said cylinder head to a second exit port, the secondary air injection system comprising:
 a first air injection path for selectively introducing air into the first exhaust leg, the first air injection path having a first supply passage providing fluid communication to a first ditch formed in the head mounting surface of the cylinder block and a first runner formed in the integrated exhaust manifold and providing fluid communication from the first ditch to the first exhaust leg; and
 a second air injection path for selectively introducing air into the second exhaust leg, the second air injection path having a second supply passage in fluid communication with a second ditch formed in the block mounting surface and a second runner formed in the integrated exhaust manifold and providing fluid communication from the second ditch to the second exhaust leg, the second ditch being isolated from the first ditch;
 wherein secondary air is injected into the first exhaust leg independently from secondary air injected into the second exhaust leg.

2. The secondary air injection system of claim 1 further comprising:
 a first valve operable coupled to the first air injection path to control injection of secondary air into the first exhaust leg; and
 a second valve operable coupled to the second air injection path to control injection of secondary air into the second exhaust leg.

3. The secondary air injection system of claim 1 wherein the first and second supply passages are formed in at least one of the cylinder head and the integrated exhaust manifold.

4. The secondary air injection system of claim 1 wherein the first and second ditches are adjacent to one another and sealably separated by the head gasket.

5. The secondary air injection system of claim 4 wherein the head gasket has an inlet port formed therethrough to provide fluid communication from the first supply passage to the first ditch.

6. The secondary air injection system of claim 5 wherein the head gasket has an outlet port therethrough to provide fluid communication from the first ditch to the first runner.

7. The secondary air injection system of claim 4 wherein the head gasket has an outlet port therethrough to provide fluid communication from the first ditch to the first runner.

8. The secondary air injection system of claim 1 wherein the first runner intersects the first exhaust leg at a first injection point that is adjacent a first valve seat formed in the cylinder head around the first exhaust port, and wherein the second runner intersects the second exhaust leg at a second injection point that is adjacent a second valve seat formed in the cylinder head around the second exhaust port.

9. The secondary air injection system of claim 1 wherein the first and second injection points are spaced approximately 7 mm from the first and second valve seats, respectively.

10. A multi-cylinder internal combustion engine comprising:
a cylinder block having at least a first cylinder and a second cylinder;
a cylinder head securely fastened to the cylinder block and having a first exhaust port formed therethrough and in fluid communication with the first cylinder and a second exhaust port formed therethrough and in fluid communication with the second cylinder;
a head gasket disposed between a head mounting surface formed on the cylinder block and a block mounting surface formed on the cylinder head
an exhaust manifold including a first exhaust leg having a first passageway formed therethrough to provide fluid communication from the first exhaust port to a first exit port and a second leg having a second passageway formed therethrough to provide fluid communication from the second exhaust port to a second exit port;
a first air injection path providing fluid communication from a first control valve through a first ditch formed in the head mounting surface of the cylinder block to the first exhaust leg; and
a second air injection path providing fluid communication from a second control valve through a second ditch formed in the block mounting surface of the cylinder head to the second exhaust leg, the second ditch being sealed from the first ditch with the head gasket;
wherein secondary air is selectively and independently introduced through the first air injection path into the first exhaust leg and through the second injection path into the second exhaust leg.

11. The internal combustion engine of claim 10 further comprising wherein a portion of the first and second air injection paths are formed in at least one of the cylinder head and the exhaust manifold.

12. The internal combustion engine of claim 11 further comprising:
a first supply passage formed in the cylinder head and a first runner formed in the exhaust manifold, wherein the first air injection path is defined from the first control valve through the first supply passage, the first ditch and the first runner to the first exhaust leg; and
a second supply passage formed in the cylinder head and a second runner formed in the exhaust manifold, wherein the second air injection path is defined from the second control valve through the second supply passage, the second ditch and the second runner to the second exhaust leg.

13. The internal combustion engine of claim 10 wherein the first and second ditches are adjacent to one another and sealably separated by the head gasket.

14. The internal combustion engine of claim 13 wherein the head gasket has an inlet port formed therethrough to provide fluid communication from the first supply path to the first ditch.

15. The internal combustion engine of claim 14 wherein the head gasket has an outlet port therethrough to provide fluid communication from the first ditch to the first runner.

16. The internal combustion engine of claim 13 wherein the head gasket has an outlet port therethrough to provide fluid communication from the first ditch to the first runner.

17. The internal combustion engine of claim 10 wherein the first runner intersects the first exhaust leg at a first injection point that is adjacent a first valve seat formed in the cylinder head around the first exhaust port, and wherein the second runner intersects the second exhaust leg at a second injection point that is adjacent a second valve seat formed in the cylinder head around the second exhaust port.

18. The internal combustion engine of claim 17 wherein the first and second injection points are spaced approximately 7 mm from the first and second valve seats, respectively.

19. An internal combustion engine comprising:
a cylinder block having four cylinders arranged in-line;
a cylinder head securely fastened to the cylinder block and at least one exhaust port formed therethrough for each of the four cylinders;
a head gasket disposed between a head mounting surface formed on the cylinder block and a block mounting surface formed on the cylinder head;
an exhaust manifold including an exhaust leg for each of the four cylinders, each exhaust leg having a passageway formed therethrough to provide fluid communication from the exhaust port to an exit port;
a first air injection path providing fluid communication from a first control valve through a first ditch formed in the head mounting surface of the cylinder block to a first pair of first exhaust legs; and
a second air injection path providing fluid communication from a second control valve through a second ditch formed in the block mounting surface of the cylinder head to a second pair of exhaust legs, the second ditch being sealed from the first ditch with the head gasket;
wherein secondary air is selectively and independently introduced through the first air injection path into the first pair of exhaust legs and through the second injection path into the second pair of exhaust legs.

20. The internal combustion engine of claim 19 further comprising:
a first supply passage formed in the cylinder head and a first pair of runners formed in the exhaust manifold, wherein the first air injection path is defined from the first control valve through the first supply passage, the first ditch and one of the first pair of runners to a first exhaust leg and from the first ditch through another of the first pair of runners to a fourth exhaust leg; and
a second supply passage formed in the cylinder head and a second pair of runners formed in the exhaust manifold, wherein the second air injection path is defined from the second control valve through the second supply passage, the second ditch and one of the second pair of runners to a second exhaust leg and from the second ditch through another of the second pair of runners to a third exhaust leg.

* * * * *